(12) United States Patent
Yang et al.

(10) Patent No.: US 8,555,343 B2
(45) Date of Patent: Oct. 8, 2013

(54) MANAGING RESOURCE ALLOCATIONS BASED ON TRAFFIC PATTERNS

(75) Inventors: Jin Yang, Orinda, CA (US); Yee Sin Chan, San Jose, CA (US); Lalit R. Kotecha, San Ramon, CA (US); Matthew W. Nelson, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 492 days.

(21) Appl. No.: 12/729,955

(22) Filed: Mar. 23, 2010

(65) Prior Publication Data
US 2011/0239273 A1 Sep. 29, 2011

(51) Int. Cl.
*H04L 29/06* (2006.01)
(52) U.S. Cl.
USPC ............................................................. 726/3

(58) Field of Classification Search
None
See application file for complete search history.

(56) References Cited

U.S. PATENT DOCUMENTS

| | | | |
|---|---|---|---|
| 2003/0035385 A1* | 2/2003 | Walsh et al. | 370/316 |
| 2003/0156584 A1* | 8/2003 | Bergenlid et al. | 370/389 |
| 2005/0160280 A1* | 7/2005 | Caslin et al. | 713/189 |
| 2006/0026682 A1* | 2/2006 | Zakas | 726/22 |
| 2007/0115893 A1* | 5/2007 | Livet et al. | 370/337 |
| 2009/0003282 A1* | 1/2009 | Meylan et al. | 370/331 |

* cited by examiner

*Primary Examiner* — Brandon Hoffman

(57) ABSTRACT

A device receives, from a user device, a request to access a network, determines whether to accept or deny the request to access the network, and monitors traffic provided to or from the user device via the network. The device also determines a traffic pattern for the user device based on the traffic, classifies the traffic as one of high throughput traffic, low packet data size traffic, or high frequency packet interval traffic, and applies different network resource control mechanisms to different classifications of the traffic.

25 Claims, 11 Drawing Sheets

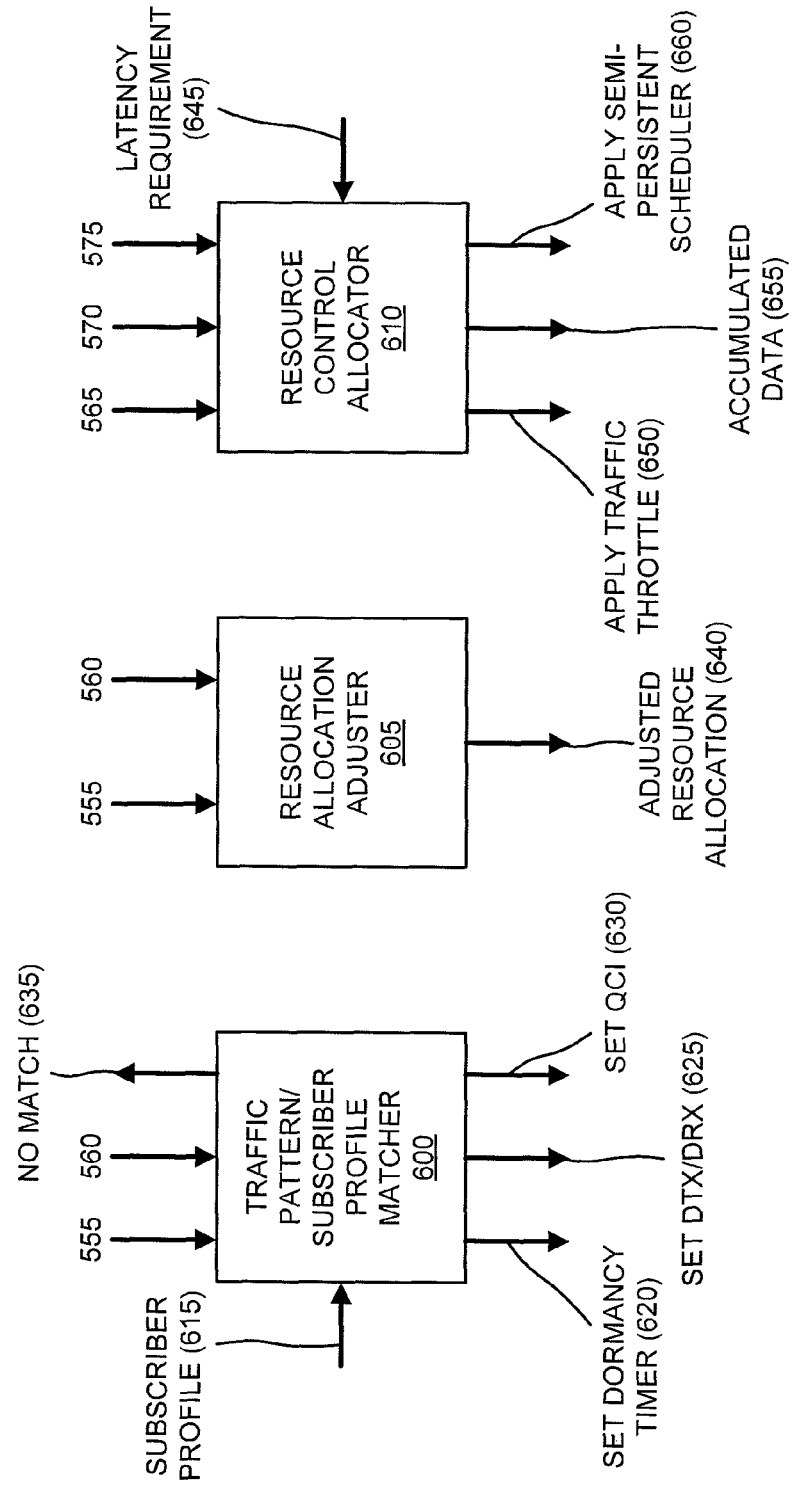

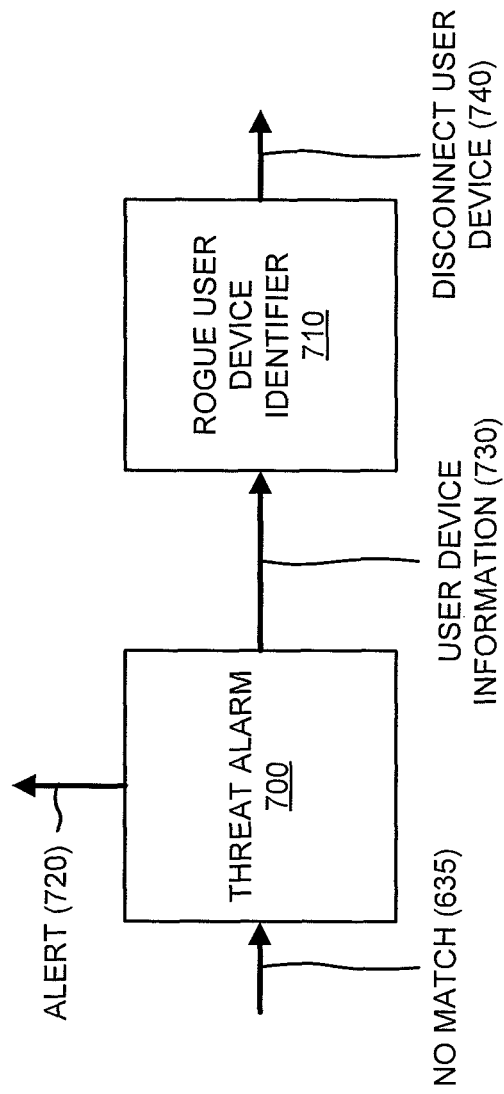

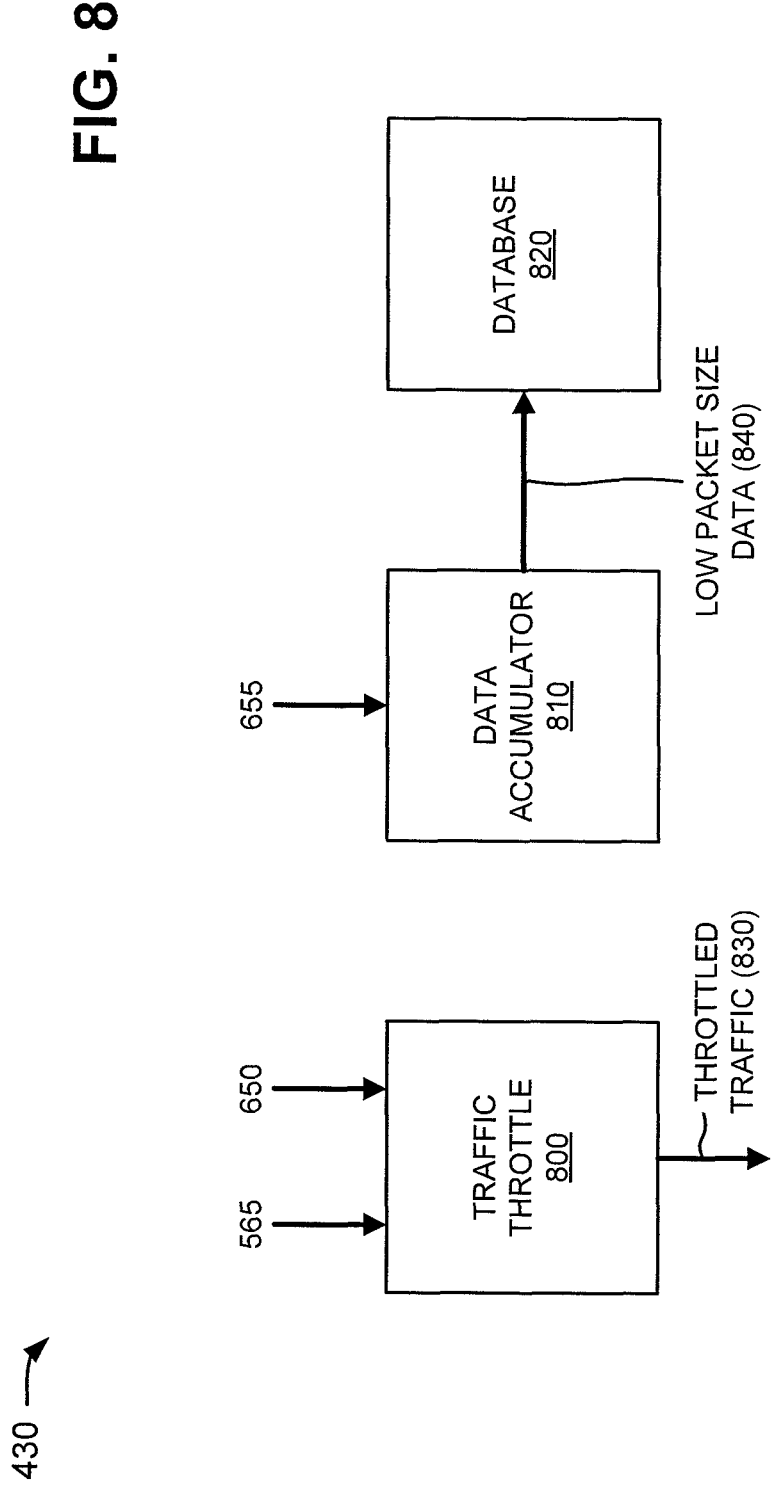

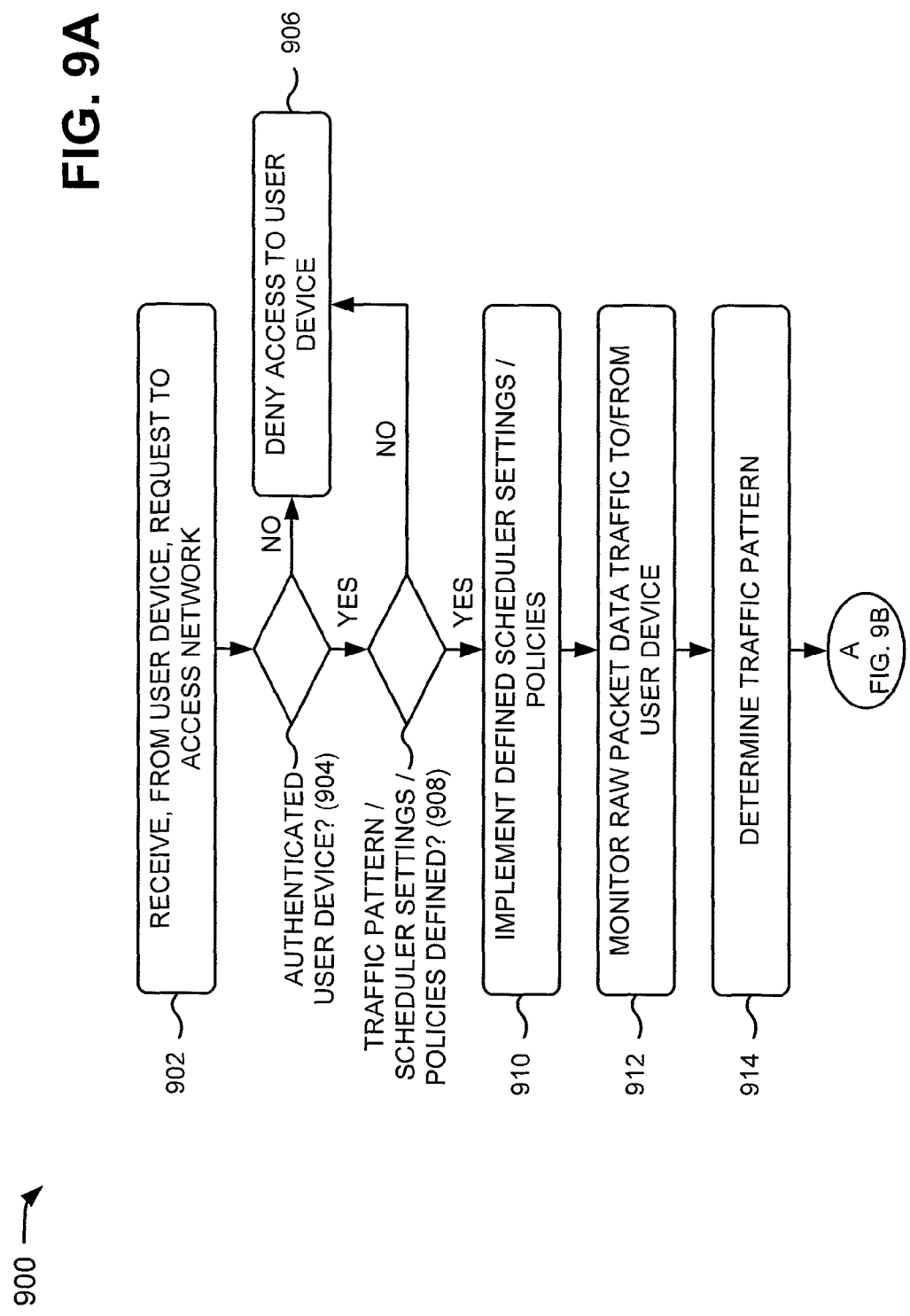

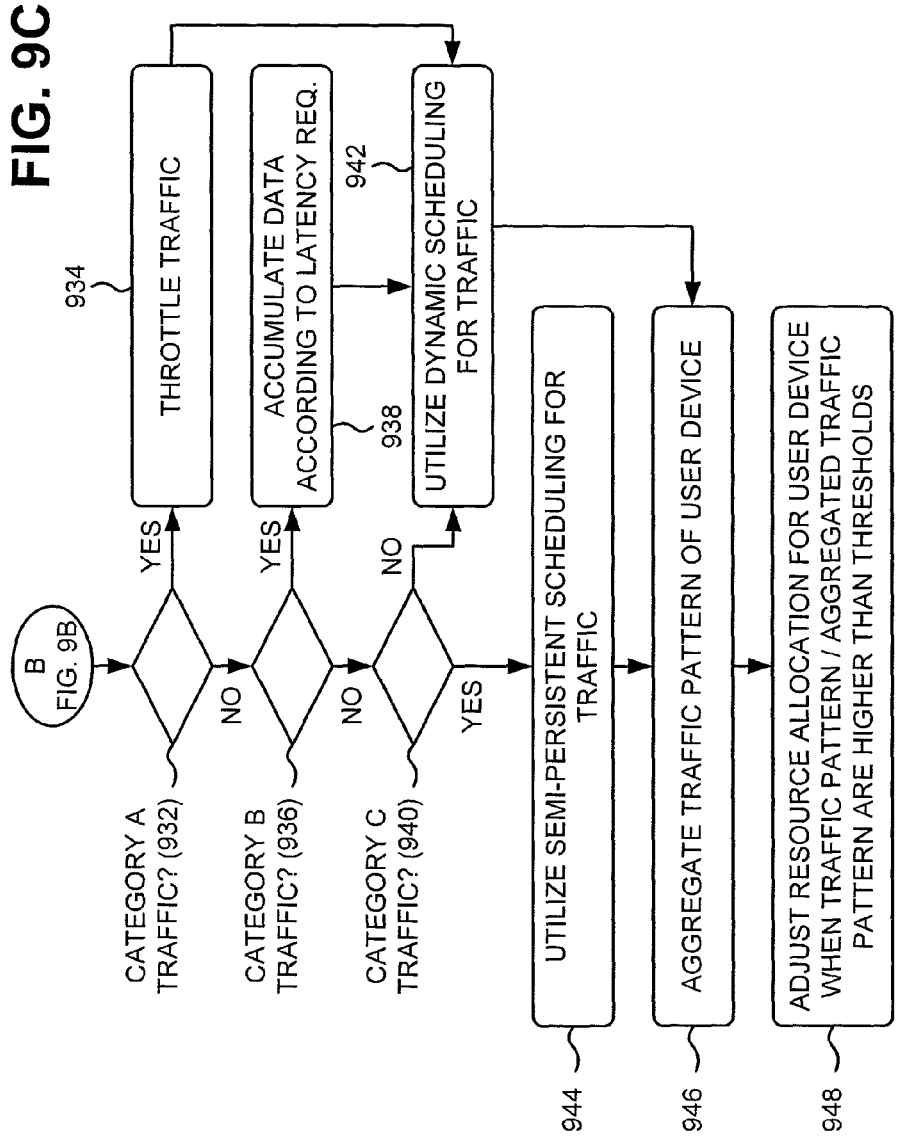

MANAGING RESOURCE ALLOCATIONS BASED ON TRAFFIC PATTERNS

BACKGROUND

As wireless networks evolve toward broadband networks, various emerging broadband applications are competing for radio resources (e.g., base stations, radio network controllers, etc.) with traditional voice and data applications. The emerging broadband applications (e.g., applications without a pre-defined quality control indicator (QCI)) may include voice over Internet protocol (VoIP) applications, high-definition television (HDTV), video-on-demand (VOD), streaming audio and video, machine-to-machine, instant messaging, presence, etc. However, such emerging applications may not be efficiently supported by the radio resources of wireless networks.

BRIEF DESCRIPTION OF THE DRAWINGS

FIG. 6 is a diagram of exemplary functional components of a network resource management mechanism depicted in FIG. 4;

FIG. 7 is a diagram of exemplary functional components of a rogue user device detector depicted in FIG. 4;

FIG. 8 is a diagram of exemplary functional components of a data buffer depicted in FIG. 4; and FIGS. 9A-9C are flow charts of an exemplary process for controlling network utilization and resources based on traffic patterns according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable a wireless network to support emerging broadband applications (e.g., VoIP, HDTV, VOD, machine-to-machine, instant messaging, presence, etc.) by managing resource allocations (e.g., of resources of the wireless network) based on packet data traffic patterns and/or requirements of the broadband applications. The systems and/or methods may maximize air links and efficiency of the wireless networks, and may prevent network outage caused by resource intensive applications. The systems and/or methods may identify rogue wireless devices (e.g., cellular telephones) by monitoring packet data traffic patterns and by comparing the monitored packet data traffic patterns with applications and/or usages invoked by the wireless devices. The systems and/or methods may alert network operators of potential rogue wireless devices and may improve network security, which may be a problem for open access wireless networks.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
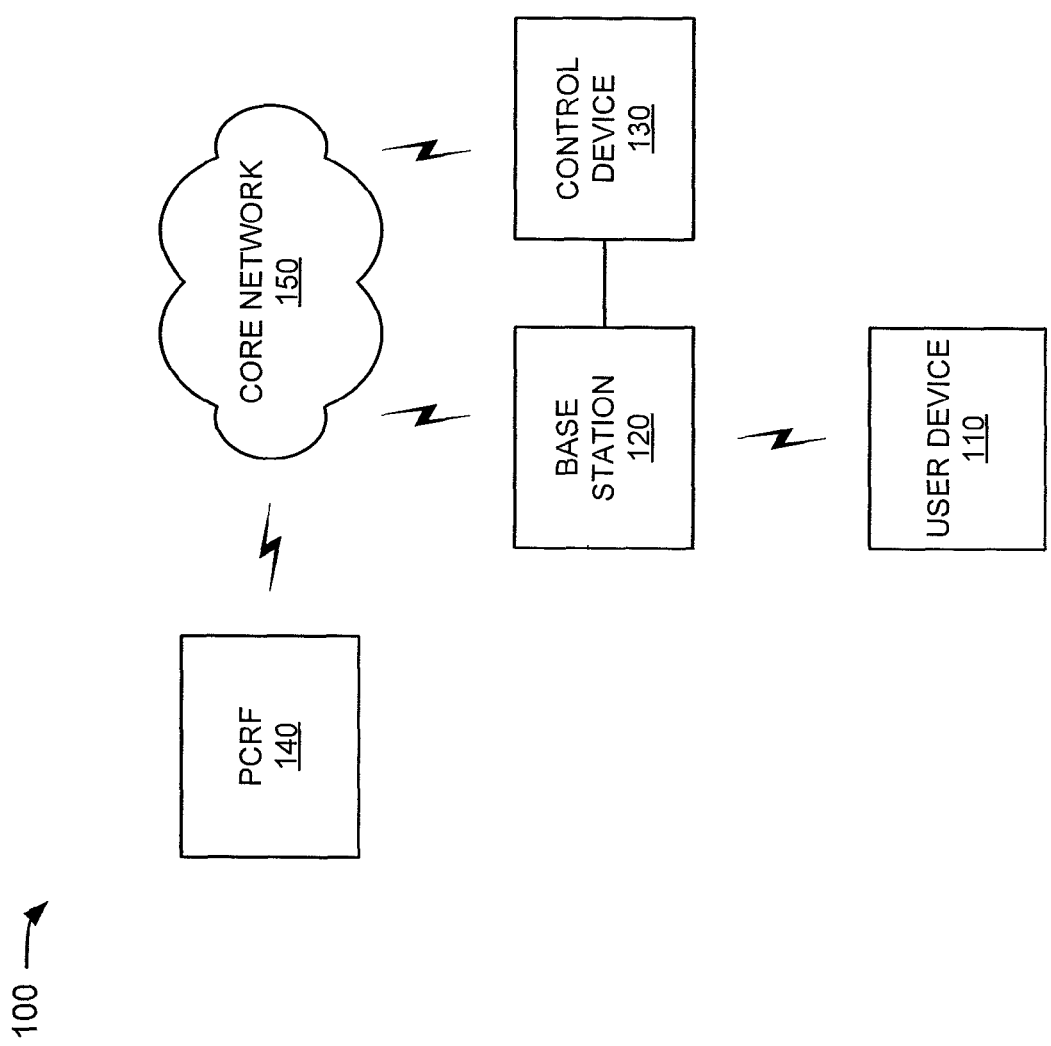
FIG. 1 is a diagram of an exemplary network in which systems and/or methods described herein may be implemented.

FIG. 1 is a diagram of an exemplary network 100 in which systems and/or methods described herein may be implemented. As illustrated, network 100 may include a user device 110, a base station 120, a control device 130, and a policy and charging rules function (PCRF) device 140 interconnected by a core network 150. Components of network 100 may interconnect via wired and/or wireless connections. A single user device 110, base station 120, control device 130, PCRF device 140, and core network 150 have been illustrated in FIG. 1 for simplicity. In practice, there may be more user devices 110, base stations 120, control devices 130, PCRF devices 140, and/or core networks 150. Also, in some instances, one or more of the components of network 100 may perform one or more functions described as being performed by another one or more of the components of network 100.

User device 110 may include one or more devices capable of sending/receiving information (e.g., voice, data, broadband applications, etc.) to/from base station 120. User device 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a cellular telephone, a smart phone, or other types of mobile communication devices.

Base station 120 (also referred to as a "Node B") may include one or more devices that receive information (e.g., voice, data, broadband applications, etc.) from core network 150 and transmit that information to user device 110 via an air interface. Base station 120 may also include one or more devices that receive information (e.g., voice, data, broadband applications, etc.) from user device 110 over an air interface and transmit that information to core network 150 or other user devices 110.

Control device 130 may include one or more server devices, or other types of computation or communication devices, that gather, process, search, and/or provide information in a manner described herein. In one implementation, control device 130 may monitor traffic patterns (e.g., packet data traffic patterns) associated with network 100 (e.g., associated with user device 110, base station 120, and/or core network 150), and may control utilization of network 100 and resources of network 100 based on the monitored traffic patterns. In one example, control device 130 may be integrated with base station 120 as a single device.

PCRF device 140 may include one or more server devices designated for real-time determination of policy rules. For example, PCRF device 140 may activate, in real-time, a set of policy rules to verify access permission, to check and debit credit balances, etc. PCRF device 140 may grant network resources (e.g., to users) based on user subscriptions and network conditions.

Core network 150 may include one or more resources (e.g., devices, components, etc.) that transfer/receive information (e.g., voice, data, broadband applications, etc.) to a circuit-switched and/or packet-switched network. In one implementation, core network 150 may include resources such as, for example, a radio network controller (RNC), a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other devices. In one implementation, core network 150 may include a wireless access network.

Although FIG. 1 shows exemplary components of network 100, in other implementations, network 100 may contain fewer components, different components, differently arranged components, or additional components than depicted in FIG. 1.

Figure 2:
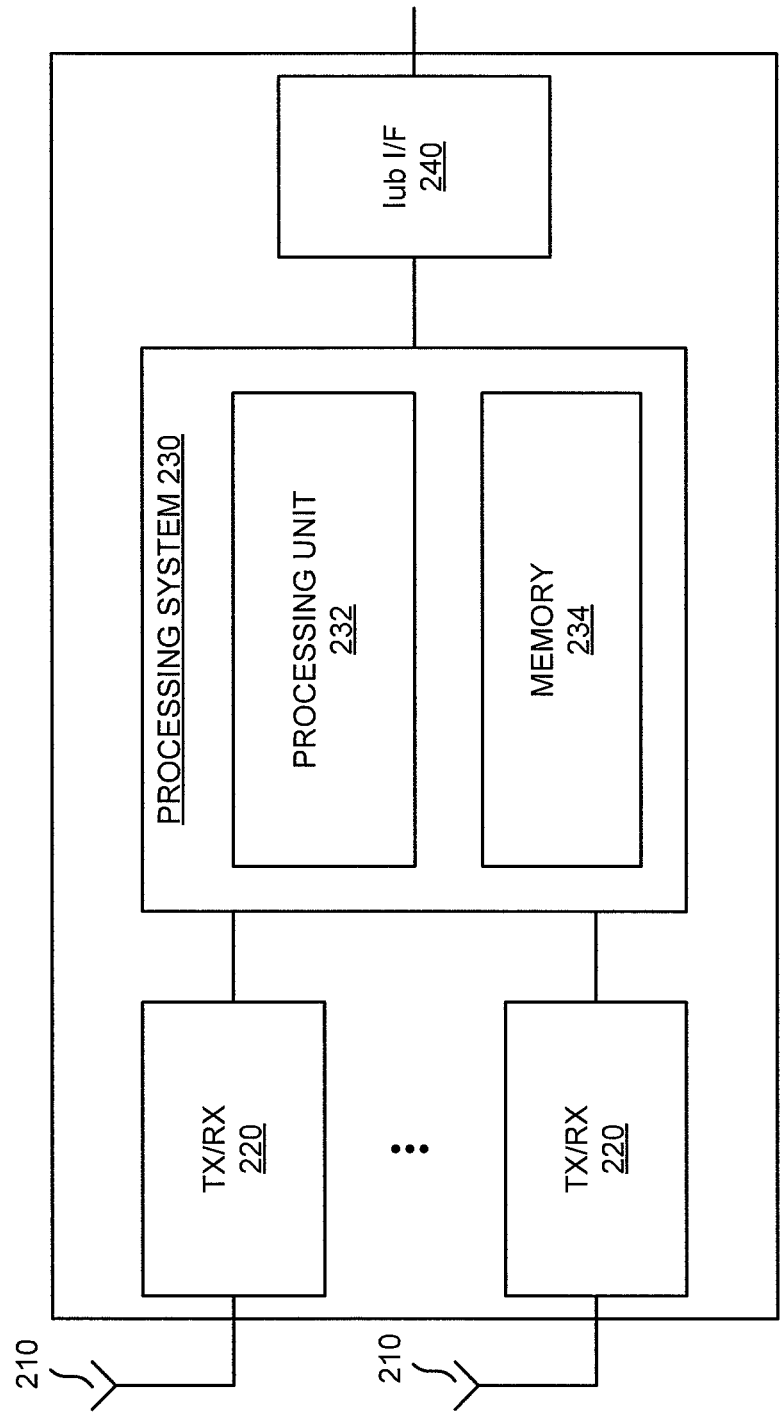
FIG. 2 is a diagram of exemplary components of a base station of the network depicted in FIG. 1.

FIG. 2 is a diagram of exemplary components of base station 120. As shown in FIG. 2, base station 120 may include antennas 210, transceivers (TX/RX) 220, a processing system 230, and an Iub interface (I/F) 240.

Antennas 210 may include one or more directional and/or omni-directional antennas. Transceivers 220 may be associated with antennas 210 and may include transceiver circuitry for transmitting and/or receiving symbol sequences in a network, such as network 100, via antennas 210.

Processing system 230 may control the operation of base station 120. Processing system 230 may also process information received via transceivers 220 and Iub interface 240. Processing system 230 may further measure quality and strength of a connection, may determine the distance to user equipment, and may transmit this information to radio network controller 124. As illustrated, processing system 230 may include a processing unit 232 and a memory 234.

Processing unit 232 may include one or more processors, microprocessors, application specific integrated circuits (ASICs), field programmable gate arrays (FPGAs), or the like. Processing unit 232 may process information received via transceivers 220 and Iub interface 240. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 232 may transmit control messages and/or data messages, and may cause those control messages and/or data messages to be transmitted via transceivers 220 and/or Iub interface 240. Processing unit 232 may also process control messages and/or data messages received from transceivers 220 and/or Iub interface 240.

Memory 234 may include a random access memory (RAM), a read-only memory (ROM), and/or another type of memory to store data and instructions that may be used by processing unit 232.

Iub interface 240 may include one or more line cards that allow base station 120 to transmit data to and receive data from a radio network controller 124 and other devices in network 100.

As described herein, base station 120 may perform certain operations in response to processing unit 232 executing software instructions of an application contained in a computer-readable medium, such as memory 234. A computer-readable medium may be defined as a physical or logical memory device. A logical memory device may include memory space within a single physical memory device or spread across multiple physical memory devices. The software instructions may be read into memory 234 from another computer-readable medium or from another device via antennas 210 and transceivers 220. The software instructions contained in memory 234 may cause processing unit 232 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows exemplary components of base station 120, in other implementations, base station 120 may contain fewer components, different components, differently arranged components, or additional components than depicted in FIG. 2. Alternatively, or additionally, one or more components of base station 120 may perform one or more other tasks described as being performed by one or more other components of base station 120.

Figure 3:
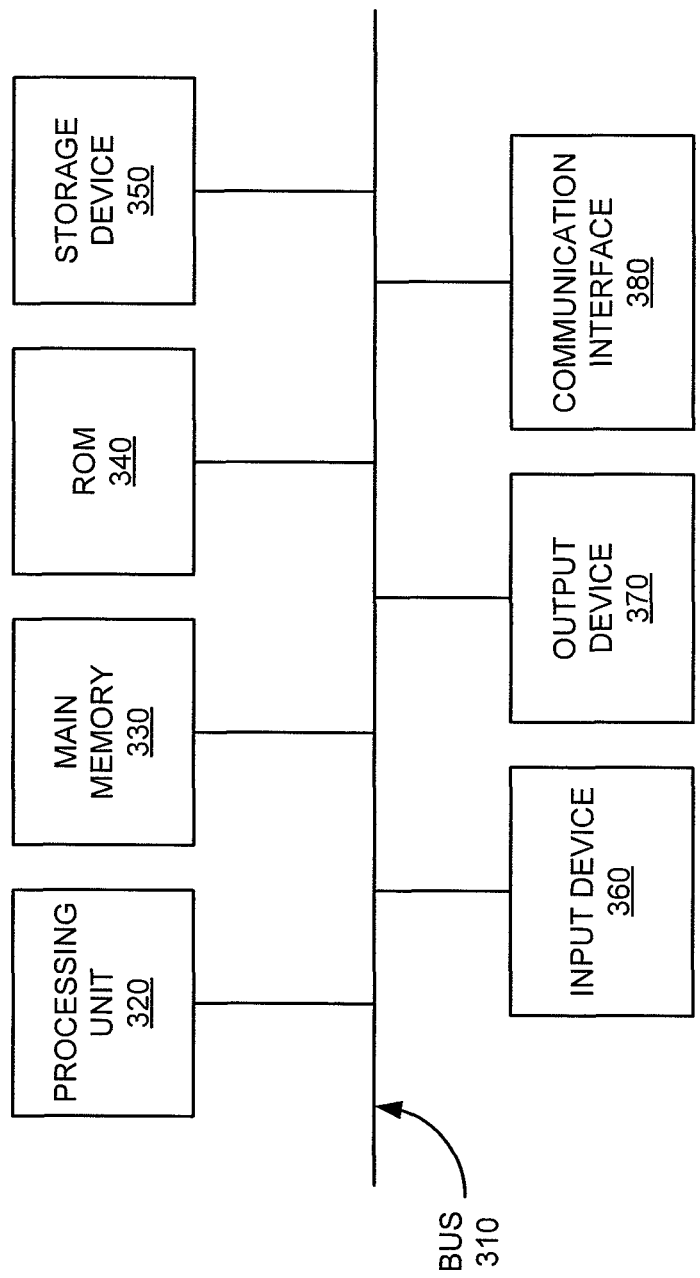
FIG. 3 is a diagram of exemplary components of a control device and/or a policy and charging rules function (PCRF) device depicted in FIG. 1.

FIG. 3 is a diagram of exemplary components of a device 300 that may correspond to control device 130 and/or PCRF device 140. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, a touch screen, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network.

As described herein, device 300 may perform certain operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer components, different components, differently arranged components, or additional components than depicted in FIG. 3. Alternatively, or additionally, one or more components of device 300 may perform one or more other tasks described as being performed by one or more other components of device 300.

Figure 4:
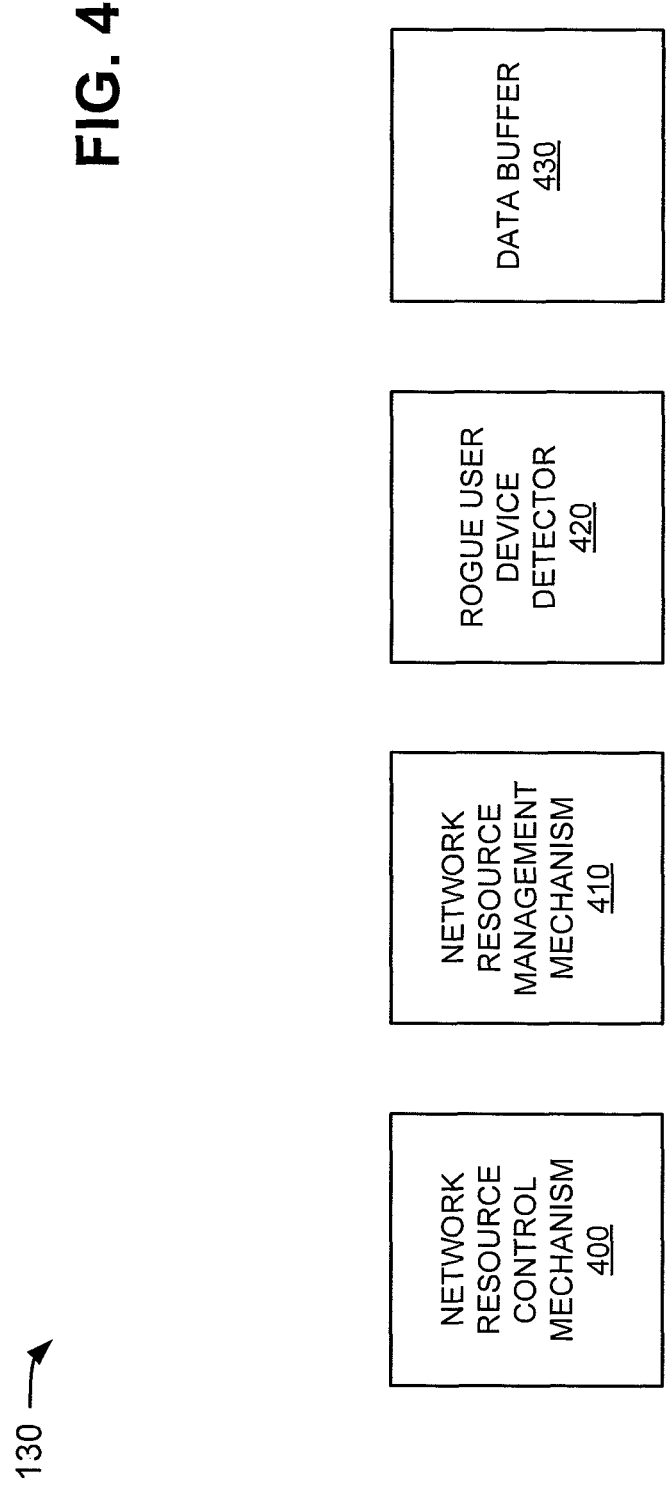
FIG. 4 is a diagram of exemplary functional components of the control device depicted in FIG. 1.

FIG. 4 is a diagram of exemplary functional components of control device 130. In one implementation, the functions described in connection with FIG. 4 may be performed by one or more components of device 300 (FIG. 3). As shown in FIG. 4, control device 130 may include a network resource control mechanism 400, a network resource management mechanism 410, a rogue user device detector 420, and a data buffer 430.

Network resource control mechanism 400 may include hardware or a combination of hardware and software that may provide admission control for a user device (e.g., user device 110) attempting to access core network 150, and may monitor utilization (e.g., by user device 110) of components of core network 150. Network resource control mechanism 400 may detect packet data traffic patterns associated with each user device 110, and may classify the detected packet data traffic patterns. Further details of network resource control mechanism 400 are provided below in the connection with FIG. 5.

Network resource management mechanism 410 may include hardware or a combination of hardware and software that may ensure that a traffic pattern associated with user device 110 matches a subscriber profile of a user of user device 110. Network resource management mechanism 410 may adjust resource allocations (e.g., of resources associated with core network 150) for user device 110, and may apply different resource control mechanisms to various categories of packet data traffic provided to/from user device 110. Further details of network resource management mechanism 410 are provided below in the connection with FIG. 6.

Rogue user device detector 420 may include hardware or a combination of hardware and software that may identify a potential threat of one or more rogue (e.g., mis-configured) user devices (e.g., user device 110), and may alert a network operator (e.g., of core network 150) of the potential threat. Further details of rogue user device detector 420 are provided below in the connection with FIG. 7.

Data buffer 430 may include hardware or a combination of hardware and software that may enable traffic throttling and low packet size data accumulation at base station 120. Further details of data buffer 430 are provided below in the connection with FIG. 8.

Although FIG. 4 shows exemplary functional components of control device 130, in other implementations, control device 130 may contain fewer functional components, different functional components, differently arranged functional components, or additional functional components than depicted in FIG. 4. Alternatively, or additionally, one or more functional components of control device 130 may perform one or more other tasks described as being performed by one or more other functional components of control device 130.

Figure 5:
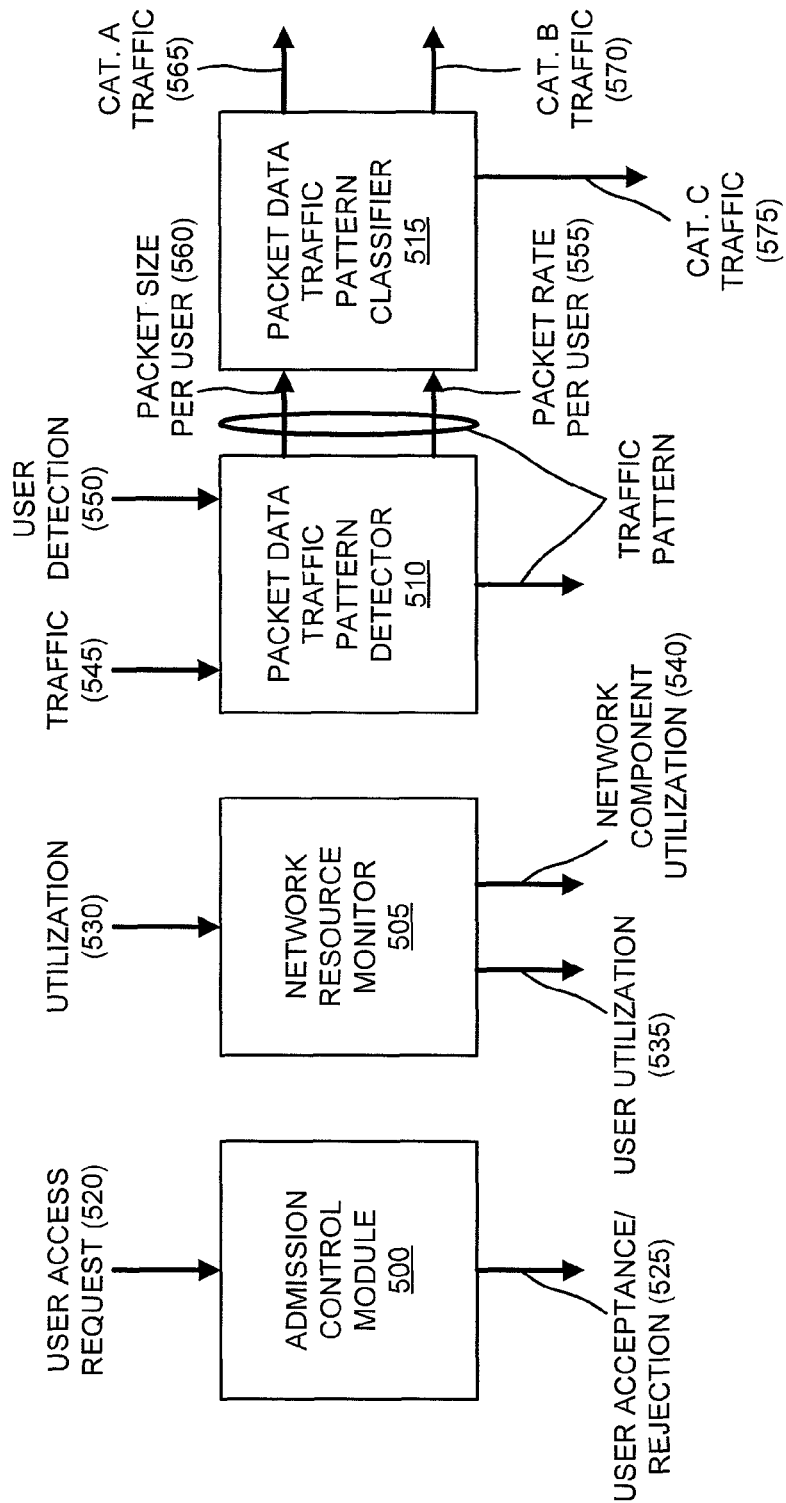
FIG. 5 is a diagram of exemplary functional components of a network resource control mechanism depicted in FIG. 4.

FIG. 5 is a diagram of exemplary functional components of network resource control mechanism 400. In one implementation, the functions described in connection with FIG. 5 may be performed by one or more components of device 300 (FIG. 3). As shown in FIG. 5, network resource control mechanism 400 may include an admission control module 500, a network resource monitor 505, a packet data traffic pattern detector 510, and a packet data traffic pattern classifier 515.

Admission control module 500 may include hardware or a combination of hardware and software that may receive a user access request 520 from user device 110. In one example, user access request 520 may include a request to access one or more resources of core network 150 (e.g., so that user device 110 may execute one or more applications). Admission control module 500 may determine whether user device 110 is an authenticated device (e.g., a device permitted to access core network 150), and may accept or reject user access request 520, as indicated by reference number 525, based on the determination of whether user device 110 is authenticated.

Network resource monitor 505 may include hardware or a combination of hardware and software that may receive utilization information 530 associated with network 100 (e.g., user device 110, base station 120 and/or core network 150). Utilization information 530 may include bandwidth utilization by user device 110, base station 120, components of core network 150, traffic rates (e.g., in packets per second) associated with user device 110, base station 120, components of core network 150, etc. Network resource monitor 505 may determine whether a portion of utilization information 530 is attributable to user device 110, and may output the determined portion as user utilization information 535. Network resource monitor 505 may determine whether a portion of utilization information 530 is attributable to network components (e.g., base station 120 and/or components of core network 150), and may output the determined portion as network component utilization information 540. In one implementation, user utilization information 535 and network component utilization information 540 may be output to a user (e.g., a network operator) of control device 130.

Packet data traffic pattern detector 510 may include hardware or a combination of hardware and software that may receive traffic 545 associated with a user device (e.g., user device 110) and may detect user device 110, as indicated by reference number 550. Based on traffic 545 and detection 550 of user device 110, packet data traffic pattern detector 510 may determine packet rate per user information 555 and packet size per user information 560 for each of the multiple user devices. Packet rate per user information 555 may include a number of packets transmitted and/or received by user device 110 in a particular number ("X") of seconds. Packet size per user information 560 may include a total packet data size ("Y") in a particular number of bytes transmitted and/or received by user device 110 in a particular number ("X") of seconds. In one example, packet size per user information 560 may include aggregated total packet data sizes transmitted and/or received by user device 110. As further shown in FIG. 5, packet rate per user information 555 and packet size per user information 560 may correspond to a traffic pattern associated user device 110, base station 120, and/or core network 150. Packet data traffic pattern detector 510 may provide packet rate per user information 555 and packet size per user information 560 to packet data traffic pattern classifier 515.

Packet data traffic pattern classifier 515 may include hardware or a combination of hardware and software that may receive packet rate per user information 555 and packet size per user information 560 (e.g., the traffic pattern) from packet data traffic pattern detector 510, and may classify traffic associated with the traffic pattern. In one example, packet data traffic pattern classifier 515 may classify the traffic as category "A" traffic 565, category "B" traffic 570, or category "C" traffic 575. Category "A" traffic 565 may include high throughput traffic (e.g., traffic having a ratio (Y/X) that is greater than a particular throughput threshold). Category "B" traffic 570 may include low packet data size traffic (e.g., traffic having a total packet data size (Y) that is smaller than a particular packet size threshold). Category "C" traffic 575 may include high frequency packet interval traffic (e.g., traffic receiving packets at an interval (e.g., as determined by X) that is less than a particular interval threshold). In one implementation, the particular throughput threshold, the particular packet size threshold, and/or the particular interval threshold may be determined by a user (e.g., a network operator) and may be provided by the user to control device 130. As further shown in FIG. 5, packet data traffic pattern classifier 515 may output category "A" traffic 565, category "B" traffic 570, and/or category "C" traffic 575.

Although FIG. 5 shows exemplary functional components of network resource control mechanism 400, in other implementations, network resource control mechanism 400 may contain fewer functional components, different functional components, differently arranged functional components, or additional functional components than depicted in FIG. 5. Alternatively, or additionally, one or more functional components of network resource control mechanism 400 may perform one or more other tasks described as being performed by one or more other functional components of network resource control mechanism 400.

FIG. 6 is a diagram of exemplary functional components of network resource management mechanism 410. In one implementation, the functions described in connection with FIG. 6 may be performed by one or more components of device 300 (FIG. 3). As shown in FIG. 6, network resource management mechanism 410 may include a traffic pattern/subscriber profile matcher 600, a resource allocation adjuster 605, and a resource control allocator 610.

Traffic pattern/subscriber profile matcher 600 may include hardware or a combination of hardware and software that may receive the traffic pattern (e.g., packet rate per user information 555 and packet size per user information 560) from packet data traffic pattern detector 510, and may receive subscriber profile information 615 (e.g., from PCRF 140). Subscriber profile information 615 may include information associated with a user of user device 110, such as services subscribed to by the user (e.g., calling plans, data plans, text messaging plans, etc.). Traffic pattern/subscriber profile matcher 600 may determine whether the traffic pattern matches subscriber profile information 615 (e.g., whether user device 110 is executing an application supported by the services subscribed to by the user). If traffic pattern/subscriber profile matcher 600 determines that the traffic pattern does not match subscriber profile information 615, traffic pattern/subscriber profile matcher 600 may output an indication 635 that there is no match.

As further shown in FIG. 6, traffic pattern/subscriber profile matcher 600 may set a dormancy timer 620 for user device 110 (e.g., providing a time that user device 110 may remain in a dormant state) according to a latency requirement associated with user device 110. Traffic pattern/subscriber profile matcher 600 may set a transmitting and/or receiving (DTX/DRX) rate 625 for user device 110 based on the traffic pattern. Traffic pattern/subscriber profile matcher 600 may set a QCI for user device 110 based on services subscribed to by the user.

Resource allocation adjuster 605 may include hardware or a combination of hardware and software that may receive the traffic pattern (e.g., packet rate per user information 555 and packet size per user information 560) from packet data traffic pattern detector 510. Resource allocation adjuster 605 may adjust a resource allocation (e.g., of resources of core network 150) for user device 110 when packet rate per user information 555 and/or packet size per user information 560 are above particular thresholds that define when user device 110 may cause a network outage (e.g., in base station 120 and/or core network 150). In one example, resource allocation adjuster 605 may adjust a resource allocation (e.g., of resources of core network 150) for user device 110 when packet rate per user information 555 and/or packet size per user information 560 indicate that the traffic pattern associated with user device 110 is above a target utilization level. Resource allocation adjuster 605 may output an adjusted resource allocation 640 to base station 120 and/or core network 150 so that resources may be reallocated.

Resource control allocator 610 may include hardware or a combination of hardware and software that may receive category "A" traffic 565, category "B" traffic 570, and category "C" traffic 575 from packet data traffic pattern classifier 515, and may receive a latency requirement 645 from PCRF 140. Latency requirement 645 may include a maximum time delay to be experienced in a network (e.g., network 100) by user device 110. Resource control allocator 610 may apply different resource control mechanisms to different categories of traffic (e.g., category "A" traffic 565, category "B" traffic 570, and category "C" traffic 575). In one implementation, resource control allocator 610 may apply a traffic throttle (e.g., at base station 120), as indicated by reference number 650, to category "A" traffic 565. In one example, resource control allocator 610 may apply traffic throttle 650 subject to latency requirement 645. In another implementation, resource control allocator 610 may accumulate data associated with category "B" traffic 570, and may output the accumulated data according to latency requirement 645; as indicated by reference number 655. In still another implementation, resource control allocator 610 may apply a semi-persistent scheduler, as indicated by reference number 660, to category "C" traffic 575. In one example, the semi-persistent scheduler may schedule category "C" traffic 575 (e.g., for transmission and/or receipt) in a periodic manner.

In a further implementation, resource control allocator 610 may apply a dynamic scheduler to category "A" traffic 565 and category "B" traffic 570, but not to category "C" traffic 575. In one example, the dynamic scheduler may schedule category "A" traffic 565 and category "B" traffic 570 (e.g., for transmission and/or receipt) in a continuous manner. In still a further implementation, resource control allocator 610 may apply one or more of the resource control mechanisms (e.g., apply traffic throttle 650, output accumulated data 655, and/or apply semi-persistent scheduler 660) when more than one category of traffic is present.

Although FIG. 6 shows exemplary functional components of network resource management mechanism 410, in other implementations, network resource management mechanism 410 may contain fewer functional components, different functional components, differently arranged functional components, or additional functional components than depicted in FIG. 6. Alternatively, or additionally, one or more functional components of network resource management mechanism 410 may perform one or more other tasks described as being performed by one or more other functional components of network resource management mechanism 410.

FIG. 7 is a diagram of exemplary functional components of rogue user device detector 420. In one implementation, the functions described in connection with FIG. 7 may be performed by one or more components of device 300 (FIG. 3). As shown in FIG. 7, rogue user device detector 420 may include a threat alarm 700 and a rogue user device identifier 710.

Threat alarm 700 may include hardware or a combination of hardware and software that may receive indication 635 (e.g., that the traffic pattern does not match subscriber profile information 615) from traffic pattern/subscriber profile matcher 600. Based on the no match indication 635, threat alarm 700 may alert 720 a network operator that user device 110 is a potential threat as a rogue user device, and may provide information 730 associated with user device 110 to rogue user device identifier 710. Information 730 may include an identifier (e.g., a telephone number) associated with user device 110; make, model, manufacturer, etc. information associated with user device 110; etc.

Rogue user device identifier 710 may include hardware or a combination of hardware and software that may receive user device information 730, and may determine whether user device 110 is a rogue (e.g., an unauthorized device connected to network 100) user device based on information 730. For example, rogue user device identifier 710 may determine whether the identifier associated with user device 110 indicates that user device is registered (e.g., in a database associated with control device 130) as an authorized device to access core network 150. If rogue user device identifier 710 determines that user device 110 is a rogue user device, rogue user device identifier 710 may disconnect user device 110 from network 100, as indicated by reference number 740.

Although FIG. 7 shows exemplary functional components of rogue user device detector 420, in other implementations, rogue user device detector 420 may contain fewer functional components, different functional components, differently arranged functional components, or additional functional components than depicted in FIG. 7. Alternatively, or additionally, one or more functional components of rogue user device detector 420 may perform one or more other tasks described as being performed by one or more other functional components of rogue user device detector 420.

FIG. 8 is a diagram of exemplary functional components of data buffer 430. In one implementation, the functions described in connection with FIG. 8 may be performed by one or more components of device 300 (FIG. 3). As shown in FIG. 8, data buffer 430 may include a traffic throttle 800, a data accumulator 810, and a database 820.

Traffic throttle 800 may include hardware or a combination of hardware and software that may receive category "A" traffic 565 from packet data traffic pattern classifier 515 and may receive instructions to apply traffic throttle 650 from resource control allocator 610. Based on apply traffic throttle 650 instructions, traffic throttle 800 may throttle category "A" traffic 565, as indicated by reference number 830. In one example, data buffer 430 may store category "A" traffic 565 in database 820, and traffic throttle 800 may periodically output throttled traffic 830 (e.g., category "A" traffic 565) stored in database 820.

Data accumulator 810 may include hardware or a combination of hardware and software that may receive accumulated data 655 (e.g., accumulated category "B" traffic 570) from resource control allocator 610. In one example, accumulated data 655 may include low packet size data 840, and data accumulator 810 may store low packet size data 840 in database 820.

Database 820 may include one or more storage devices (e.g., main memory 330, ROM 340, and/or storage device 350) that may store information received by and/or provided to control device 130. In one implementation, database 820 may store throttled traffic 830 and low packet size data 840.

Although FIG. 8 shows exemplary functional components of data buffer 430, in other implementations, data buffer 430 may contain fewer functional components, different functional components, differently arranged functional components, or additional functional components than depicted in FIG. 8. Alternatively, or additionally, one or more functional components of data buffer 430 may perform one or more other tasks described as being performed by one or more other functional components of data buffer 430.

Figure 9B:
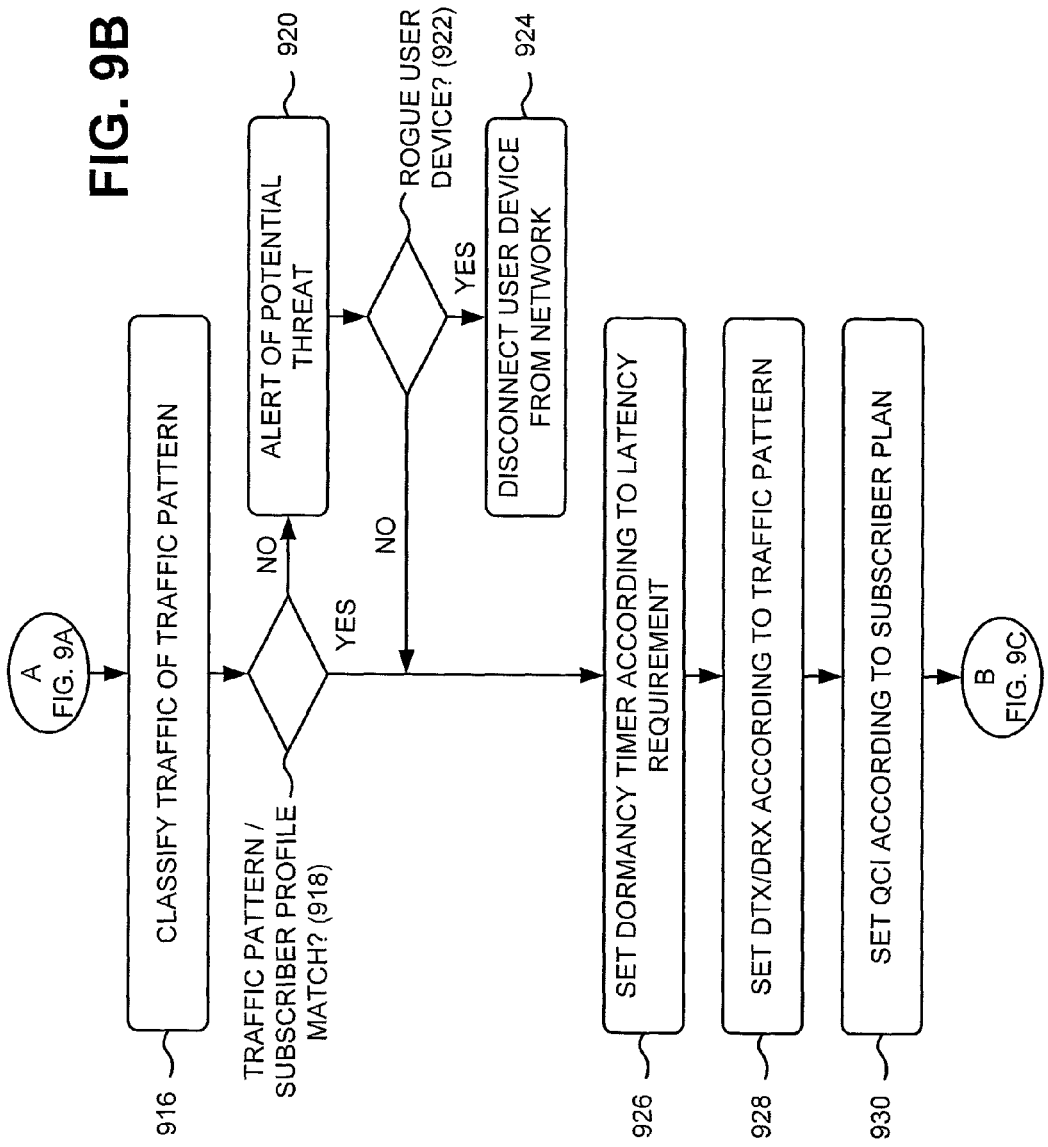

FIGS. 9A-9C are flow charts of an exemplary process 900 for controlling network utilization and resources based on traffic patterns according to implementations described herein. In one implementation, process 900 may be performed by control device 130. In another implementation, some or all of process 900 may be performed by another device or group of devices, including or excluding control device 130.

As illustrated in FIG. 9A, process 900 may include receiving, from a user device, a request to access a network (block 902), and determining whether the user device is an authenticated user device (block 904). For example, in implementations described above in connection with FIG. 5, admission control module 500 of control device 130 may receive user access request 520 from user device 110. User access request 520 may include a request to access one or more resources of core network 150 (e.g., so that user device 110 may execute one or more applications). Admission control module 500 may determine whether user device 110 is an authenticated device (e.g., a device permitted to access core network 150), and may accept or reject user access request 520, as indicated by reference number 525, based on the determination of whether user device 110 is authenticated.

As further shown in FIG. 9A, if the user device is not authenticated (block 904—NO), process 900 may include denying access to the user device (block 906). If the user device is authenticated (block 904—YES), process 900 may include determining whether traffic pattern and/or scheduling settings/policies are defined (block 908). For example, in implementations described above in connection with FIG. 5, admission control module 500 of control device 130 may accept or reject user access request 520, as indicated by reference number 525, based on the determination of whether user device 110 is authenticated. If admission control module 500 rejects user access request 520, user device 110 may be denied access to a network (e.g., core network 150) unless access request 520 is a request for emergency services (e.g., a "911" call). If admission control module 500 accepts user access request 520, control device 130 may determine whether traffic pattern and/or scheduling settings/policies are defined for user device 110. In one example, control device 130 may include one or more databases that include application traffic pattern information (e.g., associated with VoIP applications, video streaming, machine-to-machine, instant messaging, presence, etc.) and associated scheduler settings/policies information (e.g., semi-persistent scheduling, dynamic scheduling, etc.). Control device 130 may determine whether application traffic pattern information and scheduler settings/policies information are defined for user device 110.

Returning to FIG. 9A, if the traffic pattern and/or scheduling settings/policies are not defined (block 908—NO), process 900 may return to block 906 (described above). If the traffic pattern and/or scheduling settings/policies are defined (block 908—YES), process 900 may include implementing the defined scheduler settings/policies. For example, in one implementation, if control device 130 determines that application traffic pattern information and scheduler settings/policies information are not defined for user device 110, control device 130 may deny user device 110 access to a network (e.g., core network 150) unless user device 110 is requesting emergency services. If control device 130 determines that application traffic pattern information and scheduler settings/policies information are defined for user device 110, control device 130 may implement the defined scheduler settings/policies.

As further shown in FIG. 9A, process 900 may include monitoring raw packet data traffic provided to/from the user device (block 912), and determining a traffic pattern based on the monitored raw packet data traffic (block 914). For example, in implementations described above in connection with FIG. 5, packet data traffic pattern detector 510 of control device 130 may receive traffic 545 associated with user device 110 and may detect user device 110, as indicated by reference number 550. Based on traffic 545 and detection 550 of user device 110, packet data traffic pattern detector 510 may determine packet rate per user information 555 and packet size per user information 560 for each of the multiple user devices. Packet rate per user information 555 and packet size per user information 560 may correspond to a traffic pattern associated user device 110, base station 120, and/or core network 150.

As shown in FIG. 9B, process 900 may include classifying traffic associated with the traffic pattern (block 916) and determining whether the traffic pattern matches a subscriber profile associated with the user device (block 918). For example, in implementations described above in connection with FIGS. 5 and 6, packet data traffic pattern classifier 515 of control device 130 may receive packet rate per user information 555 and packet size per user information 560 (e.g., the traffic pattern) from packet data traffic pattern detector 510, and may classify traffic associated with the traffic pattern. In one example, packet data traffic pattern classifier 515 may classify the traffic as category "A" traffic 565, category "B" traffic 570, or category "C" traffic 575. Traffic pattern/subscriber profile matcher 600 of control device 130 may receive the traffic pattern (e.g., packet rate per user information 555 and packet size per user information 560) from packet data traffic pattern detector 510, and may receive subscriber profile information 615 (e.g., from PCRF 140). Traffic pattern/subscriber profile matcher 600 may determine whether the traffic pattern matches subscriber profile information 615 (e.g., whether user device 110 is executing an application supported by the services subscribed to by the user).

As further shown in FIG. 9B, if the traffic pattern and the subscriber profile do not match (block 918—NO), process 900 may include alerting an operator of a potential threat that the user device is a rogue user device (block 920) and determining whether the user device is a rogue user device (block 922). If the user device is determined to be a rogue user device (block 922—YES), process 900 may include disconnecting the user device from the network (block 924). For example, in implementations described above in connection with FIGS. 6 and 7, if traffic pattern/subscriber profile matcher 600 of control device 130 determines that the traffic pattern does not match subscriber profile information 615, traffic pattern/subscriber profile matcher 600 may output indication 635 that there is no match. Threat alarm 700 of control device 130 may receive indication 635 (e.g., that the traffic pattern does not match subscriber profile information 615) from traffic pattern/subscriber profile matcher 600. Based on the no match indication 635, threat alarm 700 may alert 720 a network operator that user device 110 is a potential threat as a rogue user device. Rogue user device identifier 710 of control device 130 may determine whether user device 110 is a rogue user device. If rogue user device identifier 710 determines that user device 110 is a rogue user device, rogue user device identifier 710 may disconnect user device 110 from network 100, as indicated by reference number 740.

Returning to FIG. 9B, if the traffic pattern and the subscriber profile match (block 918—YES) or if the user device is not determined to be a rogue user device (block 922—NO), process 900 may include setting a dormancy time according to a latency requirement (block 926), setting a DTX/DRX rate for the user device according to the traffic pattern (block 928), and setting a QCI for the user device according to a subscriber plan (block 930). For example, in implementations described above in connection with FIG. 6, traffic pattern/subscriber profile matcher 600 of control device 130 may set dormancy timer 620 for user device 110 (e.g., providing a time that user device 110 may remain in a dormant state) according to a latency requirement associated with user device 110. Traffic pattern/subscriber profile matcher 600 may set transmitting and/or receiving (DTX/DRX) rate 625 for user device 110 based on the traffic pattern. Traffic pattern/subscriber profile matcher 600 may set a quality control indicator (QCI) for user device 110 based on services subscribed to by the user.

As shown in FIG. 9C, process 900 may include determining whether traffic associated with the traffic pattern is category "A" (high-throughput) traffic (block 932). If the traffic is category "A" traffic (block 932—YES), process 900 may include throttling the traffic (block 934). For example, in implementations described above in connection with FIGS. 5 and 6, packet data traffic pattern classifier 515 of control device 130 may receive packet rate per user information 555 and packet size per user information 560 (e.g., the traffic pattern) from packet data traffic pattern detector 510, and may classify traffic associated with the traffic pattern. In one example, packet data traffic pattern classifier 515 may classify the traffic as category "A" traffic 565, category "B" traffic 570, or category "C" traffic 575. Resource control allocator 610 of control device 130 may receive category "A" traffic 565, category "B" traffic 570, and category "C" traffic 575 from packet data traffic pattern classifier 515, and may receive latency requirement 645 from PCRF 140. Resource control allocator 610 may apply different resource control mechanisms to different categories of traffic (e.g., category "A" traffic 565, category "B" traffic 570, and category "C" traffic 575). In one example, resource control allocator 610 may apply a traffic throttle (e.g., at base station 120), as indicated by reference number 650, to category "A" traffic 565 subject to latency requirement 645.

As further shown in FIG. 9C, if the traffic is not category "A" traffic (block 932—NO), process 900 may include determining whether the traffic is category "B" (low packet data size) traffic (block 936). If the traffic is category "B" traffic (block 936—YES), process 900 may include accumulating data according to the latency requirement (block 938). For example, in implementations described above in connection with FIGS. 5 and 6, packet data traffic pattern classifier 515 of control device 130 may receive packet rate per user information 555 and packet size per user information 560 (e.g., the traffic pattern) from packet data traffic pattern detector 510, and may classify traffic associated with the traffic pattern. In one example, packet data traffic pattern classifier 515 may classify the traffic as category "A" traffic 565, category "B" traffic 570, or category "C" traffic 575. Resource control allocator 610 of control device 130 may accumulate data associated with category "B" traffic 570, and may output the accumulated data according to latency requirement 645, as indicated by reference number 655.

Returning to FIG. 9C, if the traffic is not category "B" traffic (block 936—NO), process 900 may include determining whether the traffic is category "C" (high frequency packet interval) traffic (block 940). If the traffic is not category "C" traffic (block 940—NO) or subsequent to process blocks 934 or 938, process 900 may include utilizing dynamic scheduling for the traffic (block 942). For example, in implementations described above in connection with FIGS. 5 and 6, packet data traffic pattern classifier 515 of control device 130 may receive packet rate per user information 555 and packet size per user information 560 (e.g., the traffic pattern) from packet data traffic pattern detector 510, and may classify traffic associated with the traffic pattern. In one example, packet data traffic pattern classifier 515 may classify the traffic as category "A" traffic 565, category "B" traffic 570, or category "C" traffic 575. Resource control allocator 610 of control device 130 may apply a dynamic scheduler to category "A" traffic 565 and category "B" traffic 570, but not to category "C" traffic 575. The dynamic scheduler may schedule category "A" traffic 565 and category "B" traffic 570 (e.g., for transmission and/or receipt) in a continuous manner.

As further shown in FIG. 9C, if the traffic is category "C" traffic (block 940—YES), process 900 may include utilizing semi-persistent scheduling for the traffic (block 944). For example, in implementations described above in connection with FIGS. 5 and 6, packet data traffic pattern classifier 515 of control device 130 may receive packet rate per user information 555 and packet size per user information 560 (e.g., the traffic pattern) from packet data traffic pattern detector 510, and may classify traffic associated with the traffic pattern. In one example, packet data traffic pattern classifier 515 may classify the traffic as category "A" traffic 565, category "B" traffic 570, or category "C" traffic 575. Resource control allocator 610 of control device 130 may apply a semi-persistent scheduler, as indicated by reference number 660, to category "C" traffic 575. The semi-persistent scheduler may schedule category "C" traffic 575 (e.g., for transmission and/or receipt) in a periodic manner.

Returning to FIG. 9C, after process block 942 or process block 944, process 900 may include aggregating the traffic pattern of the user device (block 946), and adjusting a resource allocation for the user device when the traffic pattern and/or the aggregated traffic pattern are higher than thresholds (block 948). For example, in implementations described above in connection with FIG. 6, resource allocation adjuster 605 of control device 130 may receive the traffic pattern (e.g., packet rate per user information 555 and packet size per user information 560) from packet data traffic pattern detector 510. Resource allocation adjuster 605 may adjust a resource allocation (e.g., of resources of core network 150) for user device 110 when packet rate per user information 555 and/or packet size per user information 560 are above particular thresholds that define when user device 110 may cause a network outage (e.g., in base station 120 and/or core network 150). Resource allocation adjuster 605 may adjust a resource allocation (e.g., of resources of core network 150) for user device 110 when packet rate per user information 555 and/or packet size per user information 560 indicate that the traffic pattern associated with user device 110 is above a target utilization level. Resource allocation adjuster 605 may output an adjusted resource allocation 640 to base station 120 and/or core network 150 so that resources may be reallocated.

Systems and/or methods described herein may enable a wireless network to support emerging broadband applications (e.g., VoIP, HDTV, VOD, machine-to-machine, instant messaging, presence, etc.) by managing resource allocations (e.g., of resources of the wireless network) based on packet data traffic patterns and/or requirements of the broadband applications. The systems and/or methods may maximize air links and efficiency of the wireless networks, and may prevent network outage caused by resource intensive applications. The systems and/or methods may identify rogue wireless devices (e.g., cellular telephones) by monitoring packet data traffic patterns and by comparing the monitored packet data traffic patterns with applications and/or usages invoked by the wireless devices. The systems and/or methods may alert network operators of potential rogue wireless devices and may improve network security, which may be a problem for open access wireless networks.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 9A-9C, the order of the blocks may be modified in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a computing device and from a user device, a request to access a network;
   determining, by the computing device, that the user device is permitted to access the network based on the request;
   monitoring, by the computing device and after determining that the user device is permitted to access the network, traffic provided to or from the user device via the network;
   determining, by the computing device, a traffic pattern for the user device based on the traffic;
   receiving, by the computing device, a latency requirement from a policy and charging rules function (PCRF) device;
   classifying, by the computing device and based on the traffic pattern, the traffic as one of high throughput traffic, low packet data size traffic, or high frequency packet interval traffic;
   throttling, by the computing device, the traffic when the traffic is classified as the high throughput traffic;
   accumulating, by the computing device, data associated with the traffic based on the latency requirement when the traffic is classified as the low packet data size traffic; and
   utilizing, by the computing device, semi-persistent scheduling for the traffic when the traffic is classified as the high frequency packet interval traffic.

2. The method of claim 1, where determining that the user device is permitted to access the network comprises:
   determining that the user device is an authenticated user device; and
   permitting the user device to access the network after determining that the user device is the authenticated user device.

3. The method of claim 1, where determining that the user device is permitted to access the network comprises:
   determining that scheduler settings and policies are defined for the user device; and
   permitting the user device to access the network after determining that the scheduler settings and policies are defined for the user device.

4. The method of claim 1, further comprising:
   denying another user device access to the network when:
   the other user device is not an authenticated user device, or
   scheduler settings and policies are not defined for the other user device.

5. The method of claim 1, further comprising:
   determining whether the traffic pattern matches a subscriber profile associated with the user device;

generating an alert when the traffic pattern fails to match the subscriber profile associated with the user device; and providing the alert to an operator associated with the network,
the alert indicating that the user device is a potential threat.

6. The method of claim 5, further comprising:
determining whether the user device is a rogue user device when the traffic pattern fails to match the subscriber profile associated with the user device; and
disconnecting the user device from the network when the user device is the rogue user device.

7. The method of claim 5, further comprising:
determining whether the user device is a rogue user device when the traffic pattern fails to match the subscriber profile associated with the user device;
where, when the traffic pattern fails to match the subscriber profile or when the user device is not the rogue user device, the method further comprises one or more of:
setting a dormancy timer for the user device according to the latency requirement;
setting a transmitting rate or a receiving rate for the user device based on the traffic pattern; or
setting a quality control indicator for the user device based on the subscriber profile.

8. The method of claim 1, further comprising:
aggregating the traffic pattern for the user device with other traffic patterns associated with the user device to obtain an aggregated traffic pattern; and
adjusting, for the user device, allocation of resources of the network when the traffic pattern or the aggregated traffic pattern is greater than a particular threshold that defines when the user device will cause an outage in the network.

9. The method of claim 1, where classifying the traffic comprises:
classifying the traffic as the high throughput traffic when the traffic is associated with a packet rate that is greater than a particular throughput threshold;
classifying the traffic as the low packet data size traffic when the traffic is associated with a total packet data size that is smaller than a particular packet size threshold; and
classifying the traffic as the high frequency packet interval traffic when the traffic is associated with an interval that is less than a particular interval threshold.

10. The method of claim 9, where the particular throughput threshold, the particular packet size threshold, and the particular interval threshold are provided by a user of the computing device.

11. The method of claim 1, further comprising:
adjusting, for the user device, network resource allocations and access control parameters based on a subscriber profile associated with the user device and the traffic pattern.

12. A device comprising:
a processor to:
receive, from a user device, a request to access a network,
determine to accept the request to access the network,
monitor traffic provided to or from the user device via the network,
determine a traffic pattern for the user device based on the traffic,
receive a latency requirement from a policy and charging rules function (PCRF) device;
classify, based on the traffic pattern, the traffic as one of high throughput traffic, low packet data size traffic, or high frequency packet interval traffic,
throttle the traffic when the traffic is classified as the high throughput traffic,
accumulate data associated with the traffic based on the latency requirement when the traffic is classified as the low packet data size traffic, and
utilize semi-persistent scheduling for the traffic when the traffic is classified as the high frequency packet interval traffic.

13. The device of claim 12, where the device comprises one of:
a base station associated with the network, or
a control device associated with the base station.

14. The device of claim 12, where the processor is further to:
utilize, after accumulating the data, dynamic scheduling for transmission of the traffic when the traffic is classified as the low packet data size traffic.

15. The device of claim 12, where, when determining to accept the request, the processor is to:
determine that the user device is an authenticated user device, and
determine to accept the request based on the user device being the authenticated user device.

16. The device of claim 12, where, when determining to accept the request, the processor is to:
determine that scheduler settings and policies are defined for the user device,
determine to accept the request to access the network based on the scheduler settings and policies being defined for the user device, and
implement the scheduler settings and policies.

17. The device of claim 12, where the processor is further to:
receive another request to access the network from another user device, and
deny the other request to access the network when the other user device is not an authenticated user device or when scheduler settings and policies are not defined for the other user device.

18. The device of claim 12, where the processor is further to:
determine whether the traffic pattern matches a subscriber profile associated with the user device,
generate an alert when the traffic pattern fails to match the subscriber profile associated with the user device, and
provide the alert to an operator associated with the network,
the alert indicating that the user device is a potential threat.

19. The device of claim 18, where the processor is further to:
determine whether the user device is a rogue user device when the traffic pattern fails to match the subscriber profile associated with the user device, and
disconnect the user device from the network when the user device is the rogue user device.

20. The device of claim 18, where the processor is further to:
determine that the user device is not a rogue user device after determining that the traffic pattern fails to match the subscriber profile associated with the user device,
set a dormancy timer for the user device according to the latency requirement, set a transmitting rate or a receiving rate for the user device based on the traffic pattern, and set a quality control indicator for the user device based on the subscriber profile.

21. The device of claim 12, where the processor is further to:

aggregate the traffic pattern with other traffic patterns to obtain an aggregated traffic pattern, and adjust, for the user device, an allocation of resources of the network when the traffic pattern or the aggregated traffic pattern is greater than a particular threshold that defines when the user device will cause an outage in the network.

22. The device of claim 12, where, when classifying the traffic, the processor is to:

classify the traffic as the high throughput traffic when the traffic is associated with a packet rate that is greater than a particular throughput threshold, classify the traffic as the low packet data size traffic when the traffic is associated with a total packet data size that is smaller than a particular packet size threshold, and classify the traffic as the high frequency packet interval traffic when the traffic is associated with an interval that is less than a particular interval threshold.

23. The device of claim 22, where the particular throughput threshold, the particular packet size threshold, and the particular interval threshold are provided by a user of the device.

24. The device of claim 12, where the traffic is associated with a traffic application without a pre-defined quality control indicator (QCI).

25. A non-transitory computer-readable medium storing instructions, the instructions comprising:

one or more instructions that, when executed by at least one processor, cause the at least one processor to:

receive, from a user device, a request to access a network;

determine to permit the user device to access the network based on the request;

monitor traffic provided to or from the user device via the network;

determine a traffic pattern for the user device based on the traffic;

receive a latency requirement from a policy and charging rules function (PCRF) device;

classify, based on the traffic pattern, the traffic as one of high throughput traffic, low packet data size traffic, or high frequency packet interval traffic;

throttle the traffic when the traffic is classified as the high throughput traffic;

accumulate data associated with the traffic based on the latency requirement when the traffic is classified as the low packet data size traffic; and utilize semi-persistent scheduling for the traffic when the traffic is classified as the high frequency packet interval traffic.

* * * * *